(12) United States Patent
Brown et al.

(10) Patent No.: US 8,427,775 B2
(45) Date of Patent: Apr. 23, 2013

(54) PARTICLE-CAPTURING DEVICE INCLUDING A COMPONENT CONFIGURED TO PROVIDE AN ADDITIONAL FUNCTION WITHIN AN ENCLOSURE EXCLUSIVE OF CAPTURING PARTICLES

(75) Inventors: Charles Allan Brown, San Jose, CA (US); John Martin Burns, San Jose, CA (US); Ricardo German Duque, Dublin, CA (US); Clayton Paul Henderson, Morgan Hill, CA (US); Charles E. Hignite, San Jose, CA (US); Rocky Dikang Mai, San Mateo, CA (US); Jr-Yi Shen, Sunnyvale, CA (US)

(73) Assignee: HGST Netherlands B.V., Amsterdam (NL)

(*) Notice: Subject to any disclaimer, the term of this patent is extended or adjusted under 35 U.S.C. 154(b) by 394 days.

(21) Appl. No.: 12/827,994

(22) Filed: Jun. 30, 2010

(65) Prior Publication Data

US 2012/0002320 A1    Jan. 5, 2012

(51) Int. Cl.
*G11B 33/08* (2006.01)

(52) U.S. Cl.
USPC ................................................. 360/97.12

(58) Field of Classification Search ............. 360/97.02
See application file for complete search history.

(56) References Cited

U.S. PATENT DOCUMENTS

| | | | |
|---|---|---|---|
| 5,491,605 A * | 2/1996 | Hughbanks et al. | 360/323 |
| 5,919,581 A * | 7/1999 | Yamamoto et al. | 428/836.2 |
| 6,084,743 A * | 7/2000 | Comstock et al. | 360/99.18 |
| 6,496,997 B1 | 12/2002 | Murari et al. | |
| 6,697,232 B1 * | 2/2004 | Hipwell, Jr. et al. | 360/294.5 |
| 6,781,791 B1 * | 8/2004 | Griffin et al. | 360/128 |
| 6,801,402 B1 * | 10/2004 | Subrahmanyam et al. | 360/245.9 |
| 2005/0117257 A1 * | 6/2005 | Thaveeprungsriporn et al. | 360/246 |
| 2006/0054277 A1 * | 3/2006 | Byun et al. | 156/327 |
| 2006/0263581 A1 * | 11/2006 | Park et al. | 428/212 |
| 2008/0013207 A1 | 1/2008 | Feliss et al. | |
| 2012/0002320 A1 * | 1/2012 | Brown et al. | 360/97.02 |

FOREIGN PATENT DOCUMENTS

JP    03046774 A  *  2/1991
JP    04174980 A  *  6/1992

OTHER PUBLICATIONS

Cooper, et al., "Surface Cleaning by Electrostatic Removal of Particles", *Aerosol Science and Technology*, (Jan. 1990),116-119.
Gore Associates, et al., "Disk Drive Filters: Electrostatic Recirculation Filter", (2006),1-2.

* cited by examiner

*Primary Examiner* — David D Davis (57) ABSTRACT

A particle-capturing device. The particle-capturing device includes a component having a surface that is configured to be disposed inside an enclosure, and is configured to make contact with an air-stream carrying particles within the enclosure. The component includes an electrostatic particle-capturing portion that includes a dielectric electrically insulating portion, and a plurality of charged portions. The charged portions are embedded in the dielectric electrically insulating portion, and are configured to generate an electrostatic field coupled with the surface that captures the particles from a flow of the air-stream and confines the particles at the surface. In addition, the component is configured to provide at least one additional function within the enclosure exclusive of capturing particles.

25 Claims, 6 Drawing Sheets

┌─────────────────────────────────────────────────────────────────┐
    │               ENCLOSE A SPACE IN AN ENCLOSURE                    │
    │                              510                                 │
    └─────────────────────────────────────────────────────────────────┘
                                   ↓
    ┌─────────────────────────────────────────────────────────────────┐
    │              PRODUCE WITHIN THE SPACE AN AIR-STREAM              │
    │                              520                                 │
    └─────────────────────────────────────────────────────────────────┘
                                   ↓
    ┌─────────────────────────────────────────────────────────────────┐
    │  PROVIDE A COMPONENT WITH A PLURALITY OF CHARGED PORTIONS EMBEDDED IN A │
    │          DIELECTRIC ELECTRICALLY INSULATING PORTION              │
    │                              530                                 │
    └─────────────────────────────────────────────────────────────────┘
                                   ↓
    ┌─────────────────────────────────────────────────────────────────┐
    │  GENERATE, WITH PLURALITY OF CHARGED PORTIONS, AN ELECTROSTATIC FIELD COUPLED │
    │               WITH A SURFACE OF THE COMPONENT                    │
    │                              540                                 │
    └─────────────────────────────────────────────────────────────────┘
                                   ↓
    ┌─────────────────────────────────────────────────────────────────┐
    │     DISPOSE THE SURFACE OF THE COMPONENT WITHIN THE SPACE WITHIN THE ENCLOSURE │
    │                              550                                 │
    └─────────────────────────────────────────────────────────────────┘
                                   ↓
    ┌─────────────────────────────────────────────────────────────────┐
    │        CONFIGURE THE SURFACE OF THE COMPONENT TO COME INTO CONTACT │
    │                      WITH THE AIR-STREAM                         │
    │                              560                                 │
    └─────────────────────────────────────────────────────────────────┘
                                   ↓
    ┌─────────────────────────────────────────────────────────────────┐
    │   CAPTURE, WITH THE ELECTROSTATIC FIELD, PARTICLES FROM A FLOW OF THE AIR-STREAM │
    │                              570                                 │
    └─────────────────────────────────────────────────────────────────┘
                                   ↓
    ┌─────────────────────────────────────────────────────────────────┐
    │     CONFINE THE PARTICLES AT THE SURFACE WITH THE ELECTROSTATIC FIELD │
    │                              580                                 │
    └─────────────────────────────────────────────────────────────────┘
                                   ↓
    ┌─────────────────────────────────────────────────────────────────┐
    │ CONFIGURE THE COMPONENT TO PROVIDE AT LEAST ONE ADDITIONAL FUNCTION WITHIN THE │
    │        ENCLOSURE EXCLUSIVE OF CAPTURING PARTICLES                │
    │                              590                                 │
    └─────────────────────────────────────────────────────────────────┘
```

FIG. 5

PARTICLE-CAPTURING DEVICE INCLUDING A COMPONENT CONFIGURED TO PROVIDE AN ADDITIONAL FUNCTION WITHIN AN ENCLOSURE EXCLUSIVE OF CAPTURING PARTICLES

TECHNICAL FIELD

Embodiments of the present invention relate generally to the field of hard-disk drives (HDDs).

BACKGROUND

With the advance of HDD technology, the spacing between a magnetic-recording head and a magnetic-recording disk has become progressively smaller, on the order of a few nanometers (nm). Consequently, small disturbances in airflow that can give rise to airflow turbulence that can affect the head-to-disk spacing, or fly-height, have become of greater concern. In addition, particles carried in the air-stream can give rise to head-disk interference (HDI) events that can affect the fly-height, and may even give rise to errors in the recording, or retrieval, of information stored on the magnetic-recording disk. Thus, engineers and scientists engaged in the development of HDDs are becoming increasingly more interested in providing an HDD environment of high reliability for the storage of information, and HDD designs at reduced costs.

SUMMARY

Embodiments of the present invention include a particle-capturing device. The particle-capturing device includes a component having a surface that is configured to be disposed inside an enclosure, and is configured to make contact with an air-stream carrying particles within the enclosure. The component includes an electrostatic particle-capturing portion that includes a dielectric electrically insulating portion, and a plurality of charged portions. The charged portions are embedded in the dielectric electrically insulating portion, and are configured to generate an electrostatic field coupled with the surface that captures the particles from a flow of the air-stream and confines the particles at the surface. In addition, the component is configured to provide at least one additional function within the enclosure exclusive of capturing particles.

DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Figure 1:
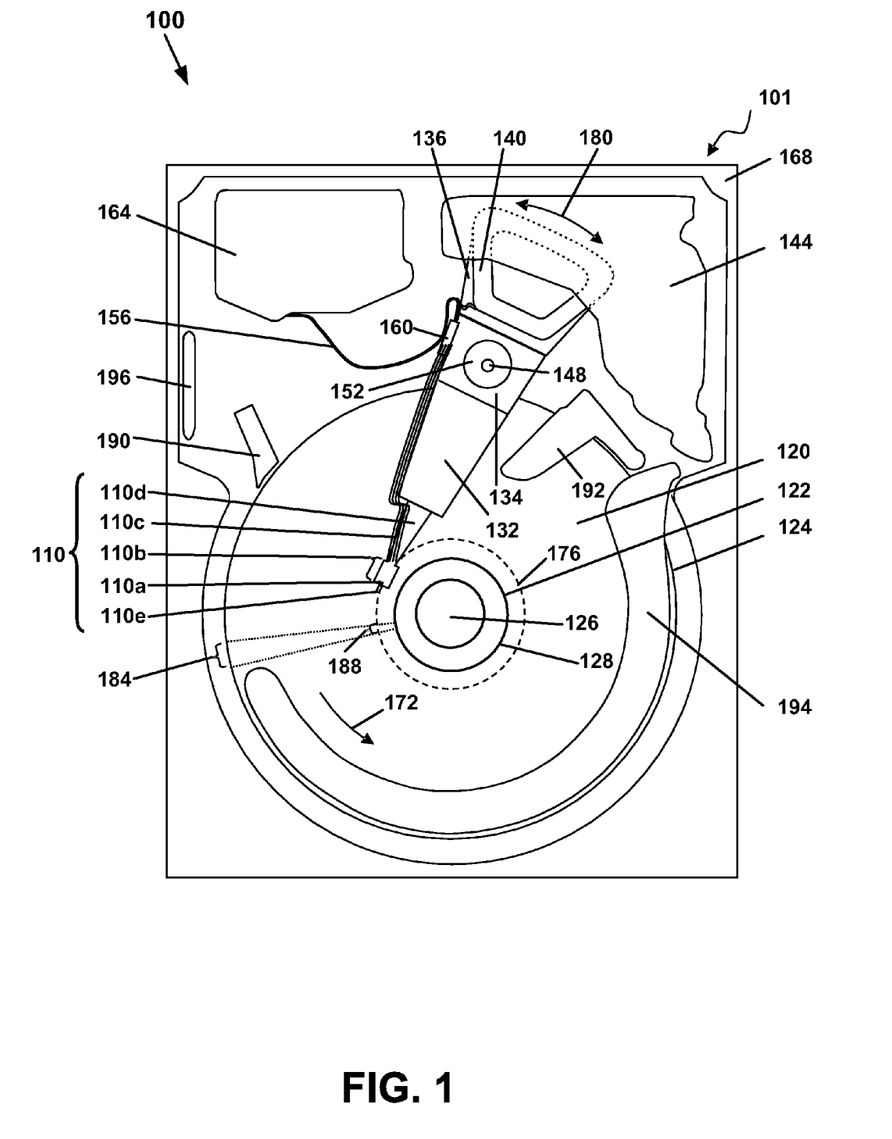
FIG. 1 is a plan view showing the arrangement of components within the example environment of a hard-disk drive (HDD) that includes at least one particle-capturing device, in accordance with embodiments of the present invention.

Physical Description of Embodiments of a Particle-Capturing Device Including a Component Configured to Provide an Additional Function within an Enclosure Exclusive of Capturing Particles With reference now to FIG. 1, in accordance with embodiments of the present invention, a plan view 100 of a hard-disk drive (HDD) 101 is shown. FIG. 1 illustrates the arrangement of components within HDD 101 including at least one particle-capturing device. HDD 101 includes at least one head-gimbal assembly (HGA) 110 including a magnetic-recording head 110a, a lead-suspension 110c attached to the magnetic-recording head 110a, and a load beam 110d attached to a slider 110b, which includes the magnetic-recording head 110a at a distal end of the slider 110b; the slider 110b is attached at the distal end of the load beam 110d to a gimbal portion of the load beam 110d. HDD 101 also includes at least one magnetic-recording disk 120 rotatably mounted on a spindle 126 and a drive motor (not shown) mounted in a disk-enclosure base 168 and attached to the spindle 126 for rotating the magnetic-recording disk 120. The magnetic-recording head 110a that includes a write element, a so-called writer, and a read element, a so-called reader, is disposed for respectively writing and reading information, referred to by the term of art, "data," stored on the magnetic-recording disk 120 of HDD 101. The magnetic-recording disk 120, or a plurality (not shown) of magnetic-recording disks, may be affixed to the spindle 126 with a disk clamp 128. HDD 101 further includes an arm 132 attached to HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and HGA 110 to access portions of the magnetic-recording disk 120, as the carriage 134 is mounted on a pivot-shaft 148 with an interposed pivot-bearing assembly 152.

With further reference to FIG. 1, in accordance with embodiments of the present invention, electrical signals, for example, current to the voice coil 140 of the VCM, write signals to and read signals from the magnetic-recording head 110a, are provided by a flexible cable 156. Interconnection between the flexible cable 156 and the magnetic-recording head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by the disk-enclosure base 168. The disk-enclosure base 168, also referred to as a casting, depending upon whether the disk-enclosure base 168 is cast, in conjunction with an HDD cover (not shown in FIG. 1, but shown in FIG. 3) provides a sealed, protective disk enclosure for the information storage components of HDD 101.

With further reference to FIG. 1, in accordance with embodiments of the present invention, other electronic components (not shown), including a disk controller and servo electronics including a digital-signal processor (DSP), provide electrical signals to the drive motor, the voice coil 140 of the VCM and the magnetic-recording head 110a of HGA 110. The electrical signal provided to the drive motor enables the drive motor to spin providing a torque to the spindle 126 which is in turn transmitted to the magnetic-recording disk 120 that is affixed to the spindle 126 by the disk clamp 128; as a result, the magnetic-recording disk 120 spins in a direction 172. The spinning magnetic-recording disk 120 creates an airflow including an air-stream, and a cushion of air that acts as an air bearing on which the air-bearing surface (ABS) of the slider 110b rides so that the slider 110b flies in proximity with the surface of the magnetic-recording disk 120 with minimal contact between the slider 110b and the magnetic-recording disk 120 in which information is recorded. The electrical signal provided to the voice coil 140 of the VCM enables the magnetic-recording head 110a of HGA 110 to access a track 176 on which information is recorded. Thus, the armature 136 of the VCM swings through an arc 180 which enables HGA 110 attached to the armature 136 by the arm 132 to access various tracks on the magnetic-recording disk 120. Information is stored on the magnetic-recording disk 120 in a plurality of concentric tracks (not shown) arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the magnetic-recording head 110a of HGA 110 reads the servo-burst-signal pattern which provides a position-error-signal (PES) to the servo electronics, which controls the electrical signal provided to the voice coil 140 of the VCM, enabling the magnetic-recording head 110a to follow the track 176. Upon finding the track 176 and identifying a particular sectored track portion 188, the magnetic-recording head 110a either reads data from the track 176, or writes data to, the track 176 depending on instructions received by the disk controller from an external agent, for example, a microprocessor of a computer system.

Embodiments of the present invention encompass within their scope a HDD 101, by way of example without limitation thereto, that includes at least one, or more, particle-capturing devices; a particle-capturing device includes a component having a surface that is configured to be disposed within an enclosure, for example, the disk enclosure of HDD 101, without limitation thereto, and is configured to make contact with an air-stream carrying particles within the enclosure. In the case of HDD 101, the air-stream may be produced by the rotation of the spinning magnetic-recording disk 120 and includes a rotational airflow in the direction 172 around the spindle 126. The air-stream may also include a flow of particles that includes adventitious particulate debris within the disk enclosure of HDD 101. The particles pose a potential challenge to stable flight of the slider 110b and, moreover, can even damage the magnetic-recording disk 120 without affecting the stable flight of the slider 110b so that the particles may cause errors in reading data from, and writing data to, the magnetic-recording disk 120. Therefore, embodiments of the present invention provide a particle-controlled space within the enclosure, for example, the disk enclosure of HDD 101. Moreover, HDD 101 is but one representative environment for embodiments of the present invention, as embodiments of the present invention also encompass within their spirit and scope particle-capturing devices for particle-controlled spaces within enclosures, more generally. For example, embodiments of the present invention include an enclosure that may be selected from the group consisting of a clean room, a glove box, a chemical hood, and an enclosure of a particle-controlled space. In addition, the component is configured to provide at least one additional function within an enclosure, for example, the disk enclosure of HDD 101, without limitation thereto, exclusive of capturing particles.

For example, with further reference to FIG. 1, in accordance with embodiments of the present invention, HDD 101 may include at least one particle-capturing device that includes a component selected from the group consisting of: the disk-enclosure base 168, a disk-enclosure cover 301 (see FIG. 3), a component portion of the head-arm assembly (HAA) 401 (see FIG. 4), a lead-suspension 110c, a slider 110b, a load-unload ramp 190 for HGA 110, an airflow spoiler 192, an airflow damper plate 194, a desiccant pack 196, and an e-coat of the disk enclosure, by way of example without limitation thereto. The load-unload ramp 190 for HGA 110 is configured to engage a tongue 110e of HGA 110 at the far distal end of HAA 401 when HAA 401 is retracted from a position for flying the magnetic-recording head 110a in proximity with the magnetic-recording disk 120. The airflow spoiler 192 spoils the air flowing toward HAA 401 positioned for flying the magnetic-recording head 110a in proximity with the recording surface of the magnetic-recording disk 120 to reduce the turbulence that buffets the magnetic-recording head 110a. The airflow spoiler 192 also spoils airflow in proximity to the magnetic-recording disk 120 to suppress disk flutter. Similarly, the airflow damper plate 194 makes the air flowing in proximity with the recording surface of the magnetic-recording disk 120 more uniform and reduces the turbulence that buffets the magnetic-recording head 110a; the airflow damper plate 194 also damps airflow in proximity to the magnetic-recording disk 120 to suppress disk flutter. As shown in FIG. 1, the damper plate 194 has a crescent shape and subtends a circular arc of about 180°.

Moreover, the damper plate 194 may be made to have a relatively large surface area, which is a surface area equal to a substantial fraction of the recording surface area of the magnetic-recording disk 120, such that the damper plate 194 may subtend an angle greater than 180° and have a radial width that extends from the outer circumference 124 towards the inner circumference 122 of the magnetic-recording disk 120. In accordance with embodiments of the present invention, the particle-capturing device including a component that includes a damper plate 194 having a surface area that is a substantial fraction of the recording surface area of the magnetic-recording disk 120 provides greater particle-capturing efficiency, but at the cost of greater air-drag, and consequently, greater power consumption by the HDD. Thus, the shape and size of the damper plate 194 may be traded off against air-drag and power consumption, depending on the HDD design specifications. The desiccant pack 196 provides for humidity control of the space within the disk enclosure. The e-coat provides a conformal encapsulation of the disk-enclosure base 168 and the disk-enclosure cover 301, which may have irregular surfaces with attached particles due to the manufacturing processes used to fabricate the disk-enclosure base 168 and the disk-enclosure cover 301. Moreover, other components having a surface that is configured to be disposed within the disk enclosure and configured to make contact with an air-stream carrying particles within the disk enclosure are also within their spirit and scope of embodiments of the present invention. Thus, in accordance with embodiments of the present invention, the enclosure includes a disk-enclosure of a hard-disk drive; and the component may be configured to provide an additional function inside the disk-enclosure of the hard-disk drive, for example, a function of any of the components listed above. Moreover, embodiments of the present invention incorporate within the environment of HDD 101, without limitation, the next described embodiments of the present invention for the particle-capturing device (see FIGS. 2A and 2B) suitable for incorporation within the environment of HDD 101.

Figure 2A:
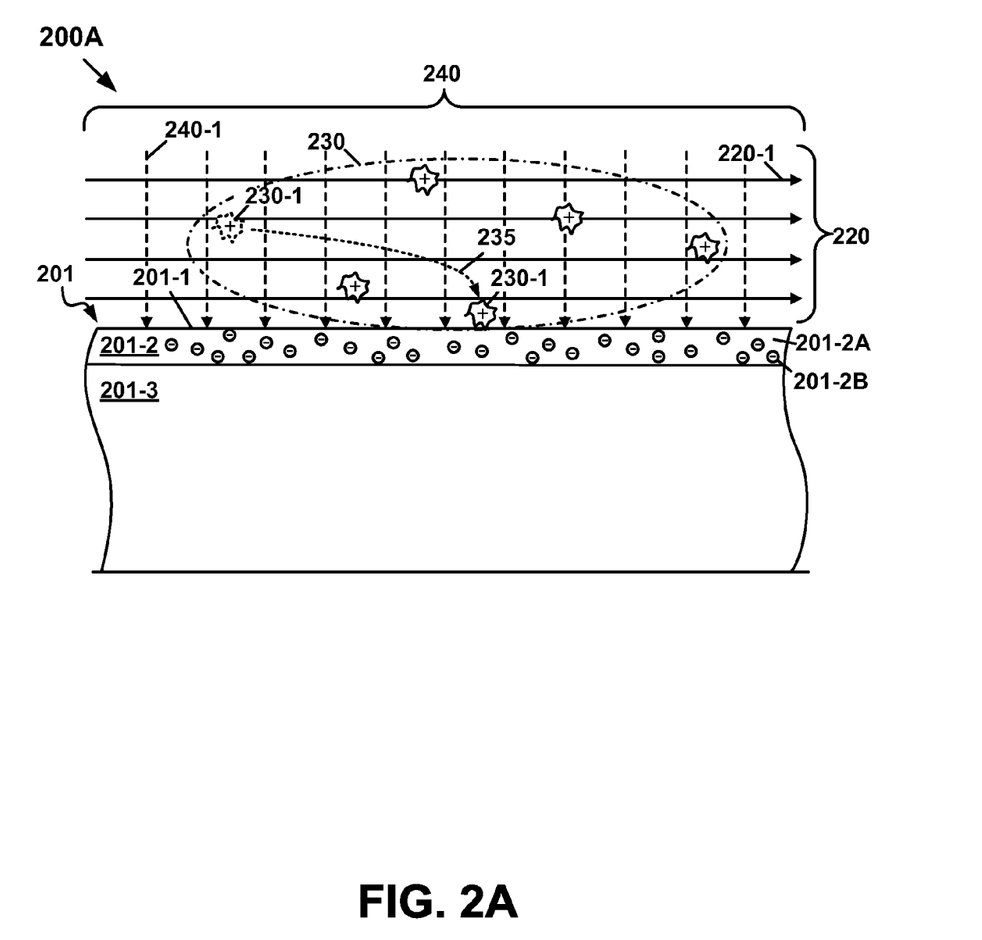
FIG. 2A is a cross-sectional elevation view showing an electrostatic particle-capturing portion of a component utilized as a particle-capturing device within an enclosure, for example, a disk enclosure of the HDD of FIG. 1, without limitation thereto, in accordance with one embodiment of the present invention.

With reference now to FIG. 2A, in accordance with embodiments of the present invention, a cross-sectional elevation view 200A is shown of an electrostatic particle-capturing portion 201-2 of a component 201. FIG. 2A illustrates the electrostatic particle-capturing portion 201-2 of the component 201 utilized as a particle-capturing device within an enclosure, for example, the disk enclosure of HDD 101, without limitation thereto. In accordance with embodiments of the present invention, the particle-capturing device includes the component 201 having a surface 201-1 that is configured to be disposed within an enclosure and configured to make contact with an air-stream 220, as shown in FIG. 2A by the solid flow lines, of which flow line 220-1 is an example, carrying particles 230 within the enclosure. As shown in FIG. 2A, the particles 230 in the air-stream 220 are positively charged, by way of example without limitation thereto, as might occur due to triboelectrical interactions with molecules in the air-stream 220. In accordance with embodiments of the present invention, the component 201 includes the electrostatic particle-capturing portion 201-2 including a dielectric electrically insulating portion 201-2A, and a plurality of charged portions, of which charged portion 201-2B is an example. As shown in FIG. 2A, the plurality of charged portions, of which charged portion 201-2B is an example, are negatively charged, by way of example without limitation thereto, as might occur due to implantation of negatively charged particles, for example, electrons, or alternatively, negatively charged ions, in the dielectric electrically insulating portion 201-2A.

With further reference to FIG. 2A, in accordance with embodiments of the present invention, the charged portions, of which charged portion 201-2B is an example, are embedded in the dielectric electrically insulating portion 201-2A and are configured to generate an electrostatic field 240, as shown in FIG. 2A by the dashed field lines, of which field line 240-1 is an example, coupled with the surface 201-1. In accordance with embodiments of the present invention, the electrostatic field 240 captures the particles 230, of which particle 230-1 (outlined with a dotted contour) is an example, from a flow of the air-stream 220 and confines the particles, of which particle 230-1 (outlined with a solid contour) is an example, at the surface 201-1 of the component 201. As shown in FIG. 2A, particle 230-1 is shown to follow a trajectory 235 under the combined action of the electrostatic field 240 and the air-stream 220. The trajectory 235 shown is parabolic, which might occur if the vector flow of the air-stream 220 carrying particle 230-1 were constant, corresponding to uniform translational motion of the air-stream parallel to the surface 201-1 of the component 201, and the electrostatic field 240 were substantially uniform and constant, corresponding to an electrostatic field perpendicular to, and in the proximity of, a flat planar surface of a component 201 having an electrostatic particle-capturing portion 201-2 with a macroscopically uniform charge distribution, by way of example without limitation thereto. In addition, in accordance with embodiments of the present invention, the component 201 is configured to provide at least one additional function within the enclosure exclusive of capturing particles 230, for example, a function of one of the components in HDD 101 previously discussed, without limitation thereto. Moreover, as shown in FIG. 2A, the electrostatic particle-capturing portion 201-2 includes a surface coating of the component 201. For example, the component 201 may include a substrate 201-3 upon which the electrostatic particle-capturing portion 201-2 is disposed as a surface coating of the component 201, by way of example without limitation thereto, as alternative electrostatic particle-capturing portions are also within the spirit and scope of embodiments of the present invention, as next described.

Figure 2B:
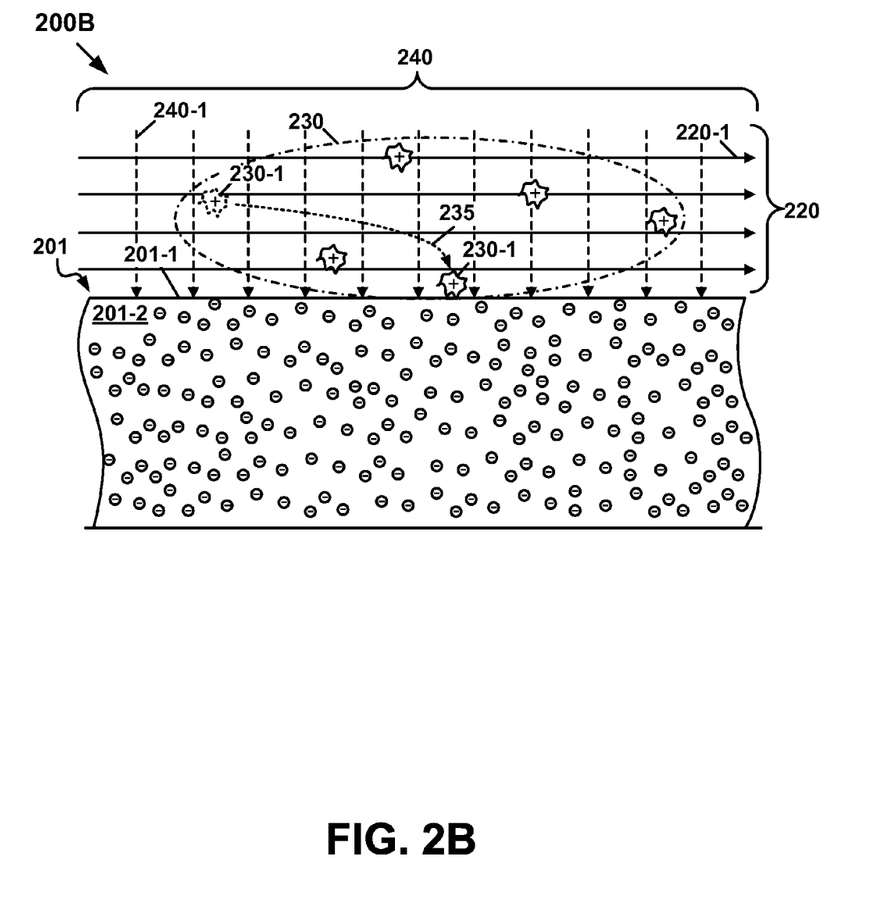
FIG. 2B is a cross-sectional elevation view showing an alternative electrostatic particle-capturing portion of a component utilized as a particle-capturing device within an enclosure, for example, the disk enclosure of the HDD of FIG. 1, without limitation thereto, in accordance with another embodiment of the present invention.

With reference now to FIG. 2B, in accordance with other embodiments of the present invention, a cross-sectional elevation view 200B is shown of an alternative electrostatic particle-capturing portion 201-2 of a component 201. FIG. 2B illustrates the alternative electrostatic particle-capturing portion 201-2 of the component 201 utilized as a particle-capturing device within an enclosure, for example, the disk enclosure of HDD 101, without limitation thereto. In accordance with embodiments of the present invention, the alternative electrostatic particle-capturing portion 201-2 includes a body of the component 201. By way of example, the electrostatic particle-capturing portion 201-2 may include a component 201 of HDD 101 with a plastic body, without limitation thereto. For example, the electrostatic particle-capturing portion 201-2 may include a component 201 of HDD 101, such as: a load-unload ramp 190 composed of plastic, or alternatively, any other component in HDD 101 composed of plastic, or suitable for fabrication in plastic form, for example, a plastic part of HDD 101. As shown in FIG. 2A, similarly labeled elements in FIG. 2B behave, and the electrostatic particle-capturing portion 201-2 of the component 201, shown in FIG. 2B, is configured, as described above in the discussion of FIG. 2A.

With further reference to FIGS. 2A and 2B, in accordance with embodiments of the present invention, the dielectric electrically insulating portion 201-2A may include a material selected from the group consisting of polyethylene, polypropylene, polycarbonate, polyoxymethylene, polyimide, polyetherimide (PEI), and other plastics configured to maintain charged portions, of which charged portion 201-2B is an example, embedded in the dielectric electrically insulating portion 201-2A. Thus, in accordance with embodiments of the present invention, HDD 101 includes one or more components, of which component 201 is an example, with a plastic configured to maintain charged portions either as the body, or alternatively, as a surface coating, of the component 201 that capture particles from the air-stream; such components may be fabricated with electret coatings, or alternatively, with electret bodies, eliminating the use of separate fibrous electret filters in HDD 101. Moreover, in another embodiment of the present invention, plastics configured to maintain charged portions, of which charged portion 201-2B is an example, may include a material that immobilizes the embedded charged portions in the dielectric electrically insulating portion 201-2A to prevent bleeding away, or loss, of charge from the charged potions so as to maintain a stable and reliable electrostatic field 240 to capture particles 230 from the air-stream 220 and confine the particles 230 at the surface 201-1 of the component 201. In accordance with embodiments of the present invention, the charged portions, of which charged portion 201-2B is an example, embedded in the dielectric electrically insulating portion 201-2A may include embedded particles selected from the group consisting of electrons, protons, electrically charged ions, and electrically charged particles; the electrically charged portions may be negatively, or alternatively positively charged, or a combination of negatively and positively charged portions. Although the electrically charged portions in FIGS. 2A and 2B are shown as negatively charged, this is by way of example without limitation thereto, as various components having negatively charged portions and other components having positively charged portions are within the spirit and scope of embodiments of the present invention. In accordance with embodiments of the present invention, the electrostatic particle-capturing portion 201-2 may include an electret. However, in accordance with embodiments of the present invention, the component 201 does not include a fibrous electret filter. In particular, in accordance with embodiments of the present invention, in the case that the enclosure is the disk enclosure of HDD 101, HDD 101 may not include a fibrous electret filter. Furthermore, in accordance with embodiments of the present invention, the component 201 does not utilize an electrical power supply to generate the electrostatic field 240.

Figure 3:
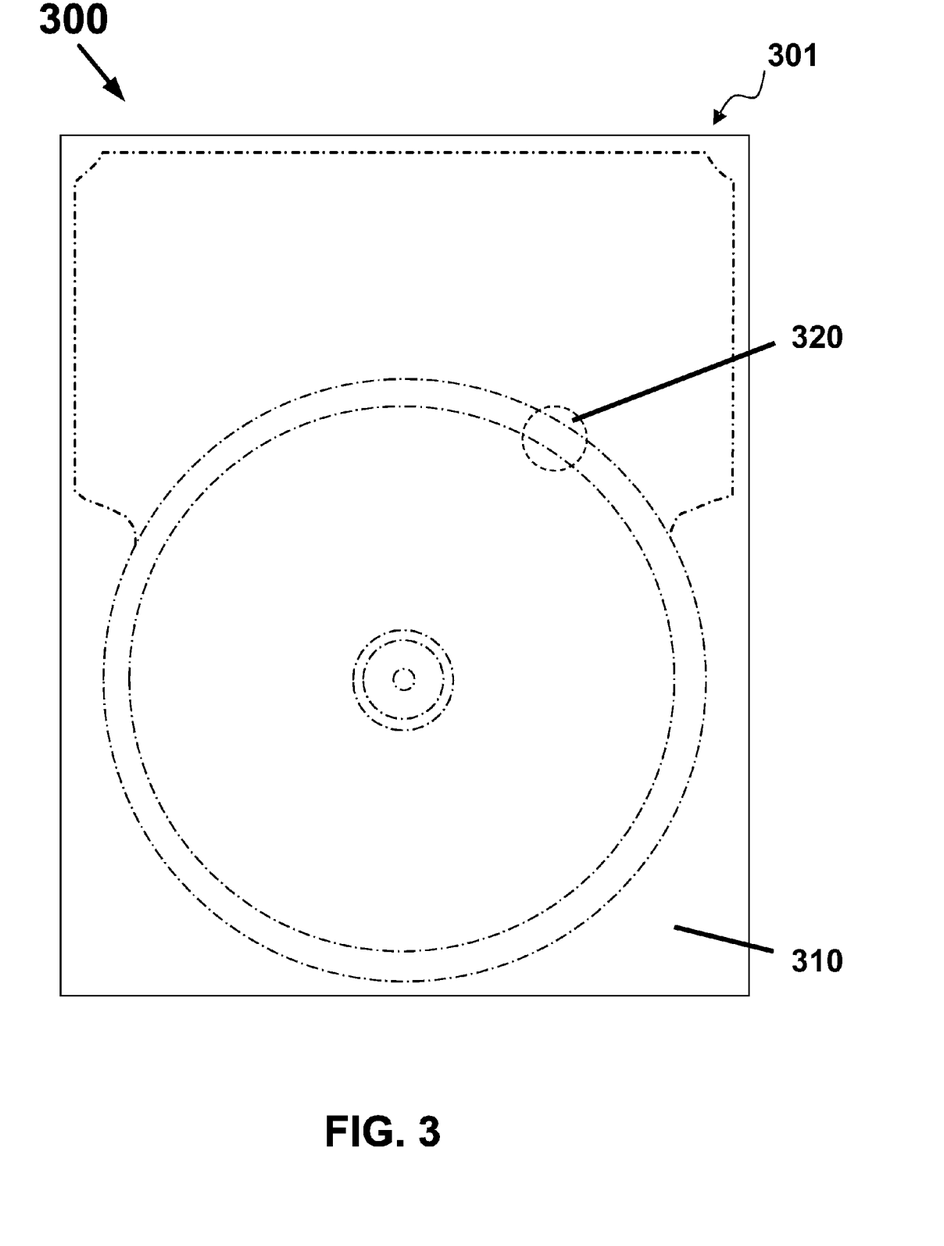
FIG. 3 is plan view showing an example component including a disk-enclosure cover utilized as a particle-capturing device within the HDD of FIG. 1, without limitation thereto, in accordance with an embodiment of the present invention.

With reference now to FIG. 3, in accordance with an embodiment of the present invention, a plan view 300 is shown of an example component including the disk-enclosure cover 301 utilized as the particle-capturing device within HDD 101 of FIG. 1. As shown in FIG. 3, the disk-enclosure cover 301 includes a cover plate 310 that is provided with airflow channels, indicated by the dot-dashed contours, for example, encircled by circle 320. The airflow channels may be provided by stamping the cover plate 310 with a suitable die; and, the disk-enclosure cover 301, as well as the disk-enclosure base 168, may include an e-coat of the disk-enclosure cover 301, or alternatively, the disk-enclosure base 168, having a surface that is configured to be disposed within the disk-enclosure and configured to make contact with an air-stream carrying particles within the disk-enclosure, which is applied as a surface coating of the disk-enclosure cover 301, as well as the disk-enclosure base 168, in a conformal electrostatic painting process, giving rise to the term of art, "e-coat." In accordance with an embodiment of the present invention, the particle-capturing device may include e-coat, as previously described, in which case the e-coat may include the electrostatic particle-capturing portion 201-2 including the dielectric electrically insulating portion 201-2A, and the plurality of charged portions, of which charged portion 201-2B is an example. In accordance with an embodiment of the present invention, the component may be configured to be disposed as a sheet of material, for example, which may include the cover plate 310, without limitation thereto, in proximity with the air-stream 220. Moreover, in accordance with an embodiment of the present invention, the component may be configured to function as at least a portion of the enclosure for a space, for example, which may include the disk-enclosure cover 301 of the space enclosed by the disk enclosure of HDD 101. However, as embodiments of the present invention may also include an enclosure that may be selected from the group consisting of a clean room, a glove box, a chemical hood, and an enclosure of a particle-controlled space, the sheet of material may include, for example, a hanging curtain of a clean room, a wall of a glove box, a side of a chemical hood, and a containment wall of an enclosure of a particle-controlled space. Similarly, the portion of the enclosure for a space may include, for example, at least one side of an enclosure that may be selected from the group consisting of a clean room, a glove box, a chemical hood, and an enclosure of a particle-controlled space. Embodiments of the present invention are not limited to the sides of enclosures, but also include components within an enclosure, an example of which is next described.

Figure 4:
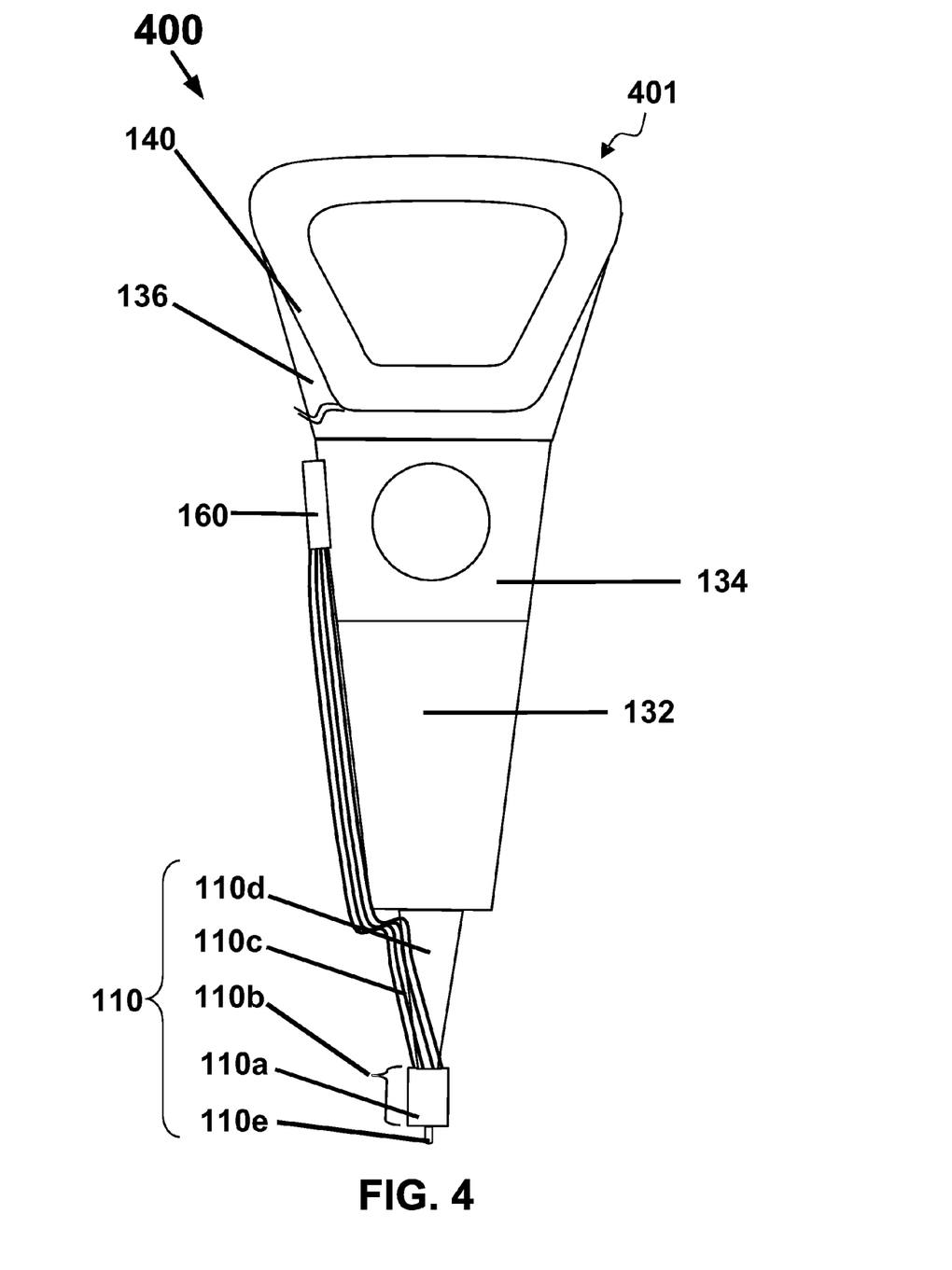
FIG. 4 is plan view showing another example component including a head-arm assembly (HAA) utilized as a particle-capturing device within the HDD of FIG. 1, in accordance with an embodiment of the present invention.

With reference now to FIG. 4, in accordance with embodiments of the present invention, a plan view 400 is shown of another example component including HAA 401 utilized as a particle-capturing device within HDD 101 of FIG. 1. In accordance with an embodiment of the present invention, the component, which the particle-capturing device includes, may include at least one component portion of HAA 401. FIG. 4 illustrates the functional arrangement of component portions of HAA 401, the component portions of which are next described. HAA 401 includes HGA 110 and the arm 132. The HAA is attached at the arm 132 to the carriage 134. The HGA 110 includes the magnetic-recording head 110a, the slider 110b, the lead-suspension 110c, the load beam 110d, and the tongue 100e, as described above in the discussion of FIG. 1. In the case of an HDD having multiple disks, or platters as disks are sometimes referred to in the art, the carriage 134 is called an "E-block," or comb, because the carriage is arranged to carry a ganged array of arms that gives the carriage 134 the appearance of a comb. Consequently, in accordance with embodiments of the present invention, multiple components providing similar function may be provided in conjunction with multiple magnetic-recording disks, such that each component includes a electrostatic particle-capturing portion; for example, the E-block may be provided with multiple HAAs, each including an electrostatic particle-capturing portion; the recording surface of each magnetic-recording disk may be provided with a dedicated HGA, each including an electrostatic particle-capturing portion; the spaces between magnetic-recording disks may be provided with individual damper plates, each including an electrostatic particle-capturing portion; and, the multiple HAAs may be provided with multiple dedicated load-unload ramps, each including an electrostatic particle-capturing portion. As shown in FIG. 4, the armature 136 of the VCM is attached to the carriage 134 and the voice coil 140 is attached to the armature 136. The AE module160 may be attached to the carriage 134 as shown. The carriage 134 is mounted on the pivot-shaft 148 (see FIG. 1) with the interposed pivot-bearing assembly 152.

With further reference to FIG. 4, in accordance with embodiments of the present invention, some of the above-described component portions of HAA 401 include a component that is disposed in proximity to a head-disk interface, for example, the magnetic-recording head 110a, the slider 110b, the lead-suspension 110c, the load beam 110d, the tongue 100e, and the arm 132. Thus, in accordance with embodiments of the present invention, these component portions of HAA 401 are well located to capture the particles 230 from a flow of the air-stream 220 and confine the particles 230 at the surface 201-1 of the component 201, which otherwise might cause a head-disk interference (HDI) event that might produce a hard error on the magnetic-recording disk 120. For example, the lead-suspension 110c which includes metallic traces on a polyimide layer may include an electrostatic particle-capturing portion, such that the polyimide provides a dielectric electrically insulating portion 201-2A in which a plurality of charged portions are embedded and configured to generate an electrostatic field coupled with the surface of the polyimide layer that captures the particles from a flow of the air-stream and confines the particles at the surface of the polyimide layer. In addition, particles 230 carried by the air-stream 220 may affect the purity of a particle-controlled space and affect the reliability of devices fabricated in, or alternatively, utilizing, a particle-controlled space, for example, the space within HDD 101. A signature of impact events with the slider produced by particles carried by the air-stream within the disk-enclosure of an HDD, for example, HDD 101, is increased non-repeatable runout (NRRO) when accessing a track 176 through the servo-feedback mechanism that controls the VCM. NRRO is an error that results in attempting to position a magnetic-recording head 110a over a sought-after track 176 during a seek operation controlled by the servo electronics. The NRRO is measured by a large PES encountered during a seek operation, and indicates that the magnetic-recording head is not properly centered over the sought-after track 176 for reading and writing operations that produces a soft error. Embodiments of the present invention are directed to reducing both the hard errors associated with damage to the magnetic-recording disk 120, and the soft errors due to NRRO associated with particles 230 carried in the air-stream 220. Moreover, embodiments of the present invention reduce the cost of assembly by eliminating the costs of including a fibrous electret filter in HDD 101, as well as the complexity of the molds for the casting and the associated cost of modifying the casting, disk-enclosure base 168, to accommodate a fibrous electret filter. Therefore, in accordance with embodiments of the present invention, HDD 101 includes a casting without a portion for installing the fibrous electret filter, which simplifies the HDD design, lowers cost, and makes for a more uniform airflow within a HDD that has lessened airflow turbulence.

Figure 5:
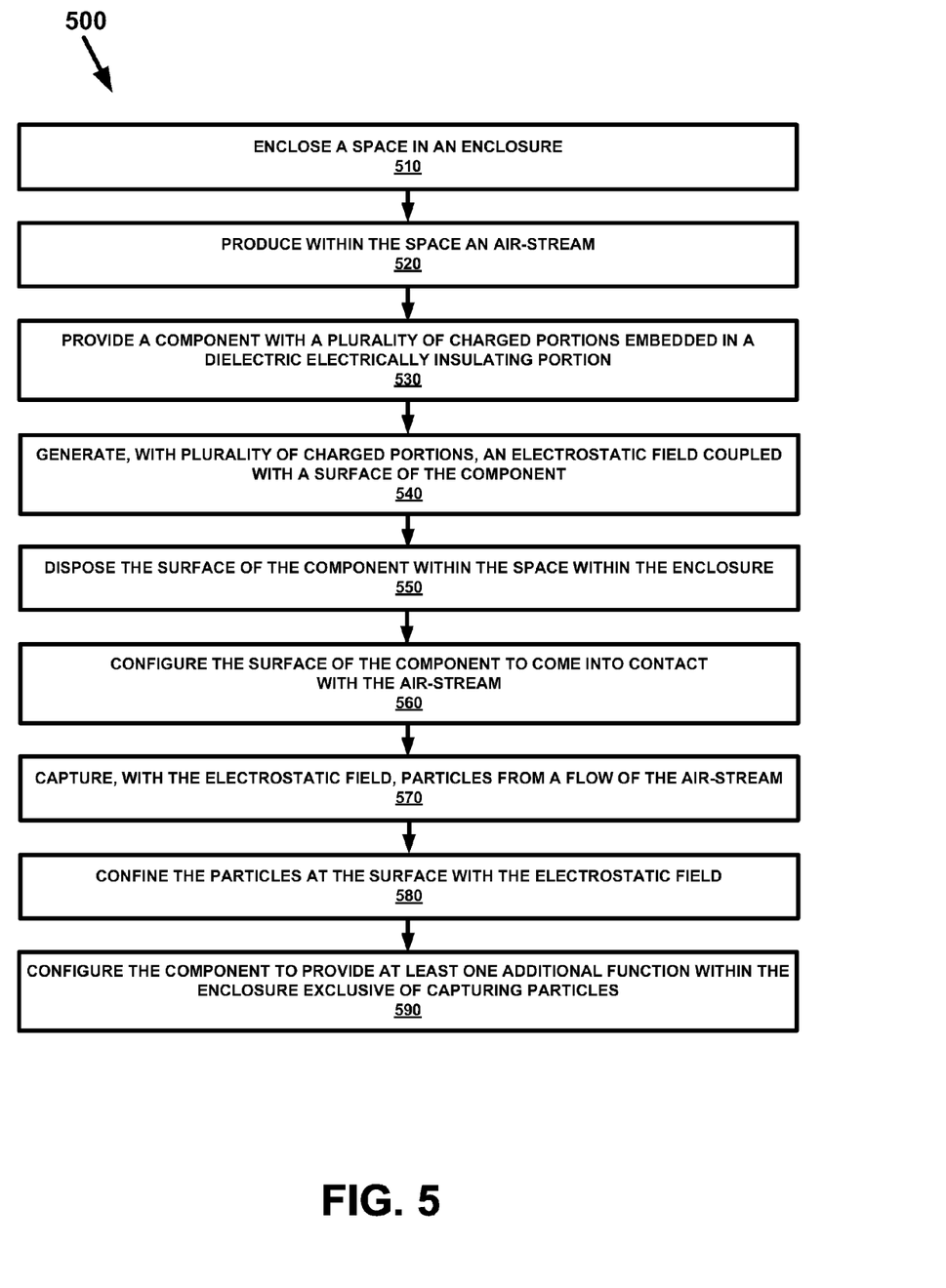
FIG. 5 is flow chart illustrating a method for capturing particles from a flow of an air-stream within a space, in accordance with an embodiment of the present invention.

Description of Embodiments of the Present Invention for a Method for Capturing Particles from a Flow of an Air-Stream With reference to FIG. 5, in accordance with embodiments of the present invention, a flow chart 500 is shown of a method for capturing particles from a flow of an air-stream within a space. The method includes the following. At 510, the space in an enclosure is enclosed. In accordance with embodiments of the present invention, the enclosure may be selected from the group consisting of a clean room, a glove box, a chemical hood, and an enclosure of a particle-controlled space. Alternatively, in accordance with embodiments of the present invention, the enclosure may include a disk-enclosure of a hard-disk drive; and, the component may be selected from the group consisting of a disk-enclosure base, a disk-enclosure cover, a component portion of a head-arm assembly, a lead-suspension, a slider, a load-unload ramp for a HGA, an airflow spoiler, an airflow damper plate, a desiccant pack, and an e-coat of the disk enclosure. At 520, the air-stream is produced within the space. At 530, the component is provided with a plurality of charged portions embedded in a dielectric electrically insulating portion. At 540, with the plurality of charged portions, an electrostatic field is generated that is coupled with a surface of the component. At 550, the surface of the component is disposed within the space within the enclosure. At 560, the surface of the component is configured to come into contact with the air-stream. At 570, the particles are captured from the flow of the air-stream with the electrostatic field. At 580, the particles are confined at the surface of the component with the electrostatic field. At 590, the component is configured to provide at least one additional function within the enclosure exclusive of capturing particles.

With further reference to FIG. 5, in accordance with embodiments of the present invention, the component does not include a fibrous electret filter. Rather, in accordance with embodiments of the present invention, the component may include an electrostatic particle-capturing portion; the electrostatic particle-capturing portion may include a dielectric electrically insulating portion, and a plurality of charged portions. Moreover, in accordance with embodiments of the present invention, the electrostatic field is generated without utilizing an electrical power supply to generate the electrostatic field coupled with the surface of the component. In accordance with embodiments of the present invention, the charged portions are embedded in the dielectric electrically insulating portion and configured to generate an electrostatic field coupled with the surface of the component that captures the particles from a flow of the air-stream and confines the particles at the surface of the component.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A particle-capturing device, comprising:
   a component having a surface that is configured to be disposed within an enclosure and configured to make contact with an air-stream carrying particles within said enclosure, said component comprising:
   an electrostatic particle-capturing portion comprising:
   a dielectric electrically insulating portion; and
   a plurality of charged portions, said charged portions embedded in said dielectric electrically insulating portion and configured to generate an electrostatic field coupled with said surface that captures said particles from a flow of said air-stream and confines said particles at said surface;
   wherein said component is configured to provide at least one additional function within said enclosure exclusive of capturing particles.

2. The device of claim 1, wherein said electrostatic particle-capturing portion comprises a surface coating of said component.

3. The device of claim 1, wherein said electrostatic particle-capturing portion comprises a body of said component.

4. The device of claim 1, wherein said enclosure comprises a disk-enclosure of a hard-disk drive; and wherein said component is configured to provide said function inside the disk-enclosure of said hard-disk drive.

5. The device of claim 4, wherein said component is selected from the group consisting of a disk-enclosure base, a disk-enclosure cover, a component portion of a head-arm assembly, a lead-suspension, a slider, a load-unload ramp for a head-arm assembly, an airflow spoiler, an airflow damper plate, a desiccant pack, and an e-coat of said disk enclosure.

6. The device of claim 1, wherein said component does not utilize an electrical power supply to generate said electrostatic field.

7. The device of claim 1, wherein said electrostatic particle-capturing portion comprises an electret.

8. The device of claim 1, wherein said dielectric electrically insulating portion comprises a material selected from the group consisting of polyethylene, polypropylene, polycarbonate, polyoxymethylene, polyirnide, polyetherimide, and plastics configured to maintain charged portions embedded in said dielectric electrically insulating portion.

9. The device of claim 1, wherein said charged portions embedded in said dielectric electrically insulating portion comprise embedded particles selected from the group consisting of electrons, protons, electrically charged ions, and electrically charged particles.

10. The device of claim 1, wherein said enclosure is selected from the group consisting of a clean room, a glove box, a chemical hood, and an enclosure of a particle-controlled space.

11. The device of claim 1, wherein said component is configured to be disposed as a sheet of material in proximity with said air-stream.

12. The device of claim 1, wherein said component is configured to function as at least a portion of said enclosure for a space.

13. The device of claim 1, wherein said component does not comprise a fibrous electret filter.

14. A hard-disk drive, comprising:
at least one a magnetic-recording disk;
at least one a magnetic-recording head disposed to read data from, and to write data to, said magnetic-recording disk; and
at least one particle-capturing device, comprising:
a component having a surface that is configured to be disposed within a disk enclosure and configured to make contact with an air-stream carrying particles within said disk enclosure, said component comprising:
an electrostatic particle-capturing portion comprising:
a dielectric electrically insulating portion; and
a plurality of charged portions, said charged portions embedded in said dielectric electrically insulating portion and configured to generate an electrostatic field coupled with said surface that captures said particles from a flow of said air-stream and confines said particles at said surface;
wherein said component is configured to provide at least one additional function within said disk enclosure exclusive of capturing particles.

15. The hard-disk drive of claim 14, wherein said electrostatic particle-capturing portion comprises a surface coating of said component.

16. The hard-disk drive of claim 14, wherein said electrostatic particle-capturing portion comprises a body of said component.

17. The hard-disk drive of claim 14, wherein said component of at least one particle-capturing device is selected from the group consisting of a disk-enclosure base, a disk-enclosure cover, a component portion of said head-arm assembly, a lead-suspension, a slider, a load-unload ramp for a head-arm assembly, an airflow spoiler, an airflow damper plate, a desiccant pack, and an e-coat of said disk enclosure.

18. The hard-disk drive of claim 14, wherein said component is disposed in proximity to a head-disk interface.

19. The hard-disk drive of claim 14, wherein said component does not utilize an electrical power supply to generate said electrostatic field.

20. The hard-disk drive of claim 14, wherein said electrostatic particle-capturing portion comprises an electret.

21. The hard-disk drive of claim 14, wherein said hard-disk drive does not include a fibrous electret 22. A method for capturing particles from a flow of an air-stream within a space, said method comprising:
enclosing said space in an enclosure;
producing within said space said air-stream;
providing a component with a plurality of charged portions embedded in a dielectric electrically insulating portion;
generating, with said plurality of charged portions, an electrostatic field coupled with a surface of said component;
disposing said surface of said component within said space within said enclosure;
configuring said surface of said component to come into contact with said air-stream;
capturing, with said electrostatic field, said particles from said flow of said air-stream;
confining said particles at said surface with said electrostatic field; and
configuring said component to provide at least one additional function within said enclosure exclusive of capturing particles.

23. The method recited in claim 22, wherein said enclosure is selected from the group consisting of a clean room, a glove box, a chemical hood, and an enclosure of a particle-controlled space.

24. The method recited in claim 22, wherein said enclosure comprises a disk-enclosure of a hard-disk drive; and wherein said component is selected from the group consisting of a disk-enclosure base, a disk-enclosure cover, a component portion of a head-arm assembly, a lead-suspension, a slider, a load-unload ramp for a head-arm assembly, an airflow spoiler, an airflow damper plate, a desiccant pack, and an e-coat of said disk enclosure.

25. The method recited in claim 22, wherein said component does not comprise a fibrous electret filter; and said electrostatic field is generated without utilizing an electrical power supply to generate said electrostatic field coupled with said surface of said component.

* * * * *

UNITED STATES PATENT AND TRADEMARK OFFICE
CERTIFICATE OF CORRECTION

PATENT NO. : 8,427,775 B2
APPLICATION NO. : 12/827994
DATED : April 23, 2013
INVENTOR(S) : Brown et al.

Page 1 of 1

It is certified that error appears in the above-identified patent and that said Letters Patent is hereby corrected as shown below:

In the Claims:

| | | |
|---|---|---|
| Column 11, Claim 5, Line 12, | Delete: "c-coat" | |
| | Insert -- e-coat -- | |
| Column 11, Claim 8, Line 21, | Delete: "polyirnide" | |
| | Insert -- polyimide -- | |
| Column 11, Claim 10, Line 31, | Delete: "particle- controlled" | |
| | Insert -- particle-controlled -- | |
| Column 12, Claim 21, Line 24, | Add: "filter." at the end of the sentence after electret. | |

Signed and Sealed this
Twenty-seventh Day of August, 2013

Teresa Stanek Rea
*Acting Director of the United States Patent and Trademark Office*